(12) United States Patent
Langtry

(10) Patent No.: US 10,300,490 B2
(45) Date of Patent: May 28, 2019

(54) ROTARY MILL

(71) Applicant: Patent Applied Technology, Delta (CA)

(72) Inventor: David Langtry, Delta (CA)

(73) Assignee: Patent Applied Technology, Delta, BC (CA)

( * ) Notice: Subject to any disclaimer, the term of this patent is extended or adjusted under 35 U.S.C. 154(b) by 298 days.

(21) Appl. No.: 14/812,368

(22) Filed: Jul. 29, 2015

(65) Prior Publication Data
US 2016/0136650 A1 May 19, 2016

Related U.S. Application Data

(60) Provisional application No. 62/037,884, filed on Aug. 15, 2014, provisional application No. 62/030,136, filed on Jul. 29, 2014.

(51) Int. Cl.
| | | |
|---|---|---|
| B02C 13/00 | (2006.01) | |
| B02C 13/28 | (2006.01) | |
| B02C 13/09 | (2006.01) | |
| B02C 13/08 | (2006.01) | |
| B02C 13/286 | (2006.01) | |
| B02C 13/288 | (2006.01) | |
| B02C 23/12 | (2006.01) | |
| E01F 9/512 | (2016.01) | |
| B05D 5/06 | (2006.01) | |
| C09D 5/33 | (2006.01) | |

(Continued)

(52) U.S. Cl.
CPC .............. B02C 13/28 (2013.01); B02C 13/08 (2013.01); B02C 13/09 (2013.01); B02C 13/2804 (2013.01); B02C 13/286 (2013.01); B02C 13/288 (2013.01); B02C 23/12 (2013.01); B03B 9/062 (2013.01); B05D 5/063 (2013.01); C03B 1/02 (2013.01); C03C 1/04 (2013.01); C03C 17/001 (2013.01); C09D 5/004 (2013.01); E01F 9/512 (2016.02); E01F 9/524 (2016.02); B02C 2013/28609 (2013.01); Y02W 30/521 (2015.05); Y02W 30/60 (2015.05)

(58) Field of Classification Search
CPC ..... B02C 13/288; B02C 13/286; B02C 13/28; B02C 13/09
USPC ........................................ 241/197
See application file for complete search history.

(56) References Cited

U.S. PATENT DOCUMENTS 4,193,719 A * 3/1980 Oaks ..................... B23C 5/207
407/41
5,529,249 A * 6/1996 Braun .................... B02C 13/06
241/189.1

(Continued)

Primary Examiner — Faye Francis
(74) Attorney, Agent, or Firm — Adrian D. Battison; Ade & Company Inc.; Kyle R. Satterthwaite

(57) ABSTRACT

A rotary mill for grinding recycled glass materials into particles has a housing defining an impact chamber with a rotor in the chamber at the bottom of an inclined guide wall underneath the feed opening. The rotor has a plurality of axially extending, angularly spaced massive impact hammers so that the impact hammers impact and deflect the solid materials onto a plurality of shatter bars located at the peripheral wall. Each of the impact hammers has a leading blade element of a hardened steel which has a front face inclined relative to a bottom portion of the guide surface so that an outer edge of the front face is angularly advanced relative to an inner edge thereof.

9 Claims, 3 Drawing Sheets

(51) Int. Cl.
  *B03B 9/06* (2006.01)
  *C03B 1/02* (2006.01)
  *C03C 1/04* (2006.01)
  *C03C 17/00* (2006.01)
  *E01F 9/524* (2016.01)

(56) References Cited

U.S. PATENT DOCUMENTS

| | | | | |
|---|---|---|---|---|
| 5,950,945 | A * | 9/1999 | Schaller | B02C 13/28 |
| | | | | 241/189.1 |
| 6,045,069 | A | 4/2000 | Steed | |
| 6,079,649 | A * | 6/2000 | Balvanz | B02C 13/09 |
| | | | | 241/189.1 |
| 6,419,173 | B2 * | 7/2002 | Balvanz | B02C 13/2804 |
| | | | | 241/195 |
| 7,416,144 | B2 * | 8/2008 | Kammerer | B02C 18/18 |
| | | | | 241/197 |
| 9,604,222 | B2 * | 3/2017 | Fredsall | B02C 18/184 |
| 9,675,976 | B2 * | 6/2017 | Roozeboom | B02C 13/2804 |
| 2001/0045478 | A1 * | 11/2001 | Recker | B02C 18/145 |
| | | | | 241/294 |
| 2003/0127550 | A1 * | 7/2003 | Stemper | B02C 13/2804 |
| | | | | 241/294 |

\* cited by examiner

ROTARY MILL

This application claims the benefit under 35 USC 119(e) of Provisional Application 62/030,136 filed Jul. 29, 2014 and of Provisional Application 62/037,884 filed Aug. 15, 2014 the disclosures of which are hereby incorporated by reference.

This invention relates to a rotary mill.

BACKGROUND OF THE INVENTION

In U.S. Pat. No. 6,045,069 (Steed) issued Apr. 4, 2000 is disclosed a rotary mill for reduction of recycled glass to ground glass particles. The rotary mill comprises a primary reduction chamber, a secondary reduction chamber and an outlet chamber. Glass entering the primary reduction chamber is deflected by an impact rotor, which shatters the material and sends the resulting particles into a plurality of shatter bars. The shatter bars further reduce these particles and deflect them back towards the rotor so that the reduced particles encounter newly shattered material, causing further attrition. In addition, the rotary mill includes an exhaust fan arranged to generate an airflow from the primary reduction chamber, through the secondary reduction chamber and into the outlet chamber. This airflow carries the reduced particles into the secondary reduction chamber wherein the particles are thrown against reduction means. The reduction means are positioned between the secondary reduction chamber and the outlet chamber such that only particles below a certain size enter the outlet chamber. Material of sufficiently reduced size enters the outlet chamber wherein it is separated into fine particles and heavier particles. Specifically, the heavier particles fall out of the airflow and gather at the base of the outlet chamber until a sufficient weight accumulates to open the balance door which expels the heavy material from the rotary mill.

The particles generated by the above system tend to be much finer than conventional grinding systems so that the reflectivity of the ground material is improved.

SUMMARY OF THE INVENTION

According to the invention there is provided apparatus for grinding solid materials into particles comprising:

a housing having an impact chamber defined within the housing;

a rotor mounted in the impact chamber of the housing rotatable about a longitudinal axis of the rotor;

the impact chamber of the housing having a peripheral wall surrounding the axis of the rotor;

a feed opening in the peripheral wall of the impact chamber for receiving the solid materials from a feed system positioned above the feed opening for deposit onto the rotor so that rotation of the rotor acts to throw the solid materials against the peripheral wall;

the rotor having a plurality of axially extending, angularly spaced impact hammers at its periphery for rotation about the axis of the rotor which is transverse to the feed opening;

the rotor being positioned relative to the feed opening such that said impact hammers impact and deflect the solid materials entering through the feed opening, thereby fragmenting the solid materials to form finer and coarser particles;

a plurality of shatter bars located at the peripheral wall of the impact chamber arranged such that the shatter bars contact the deflected solid materials, thereby further fragmenting the solid material into said particles;

a second outlet chamber defined within the housing downstream of the rotor with the first impact chamber and the second outlet chamber being connected such that the particles pass from the first chamber to the second chamber;

a finer particle outlet duct connected to the outlet chamber and arranged to receive the particles therefrom;

a bottom discharge for allowing release of coarser particles from a bottom of the outlet chamber;

an inclined guide wall at the feed opening in the peripheral wall of the impact chamber which is directed from the opening toward the rotor;

the guide wall being inclined downwardly into the impact chamber and transversely across the opening so that the solid material slides along the guide wall into the chamber to the rotor;

a bottom edge of the guide wall being located closely adjacent the impact hammers as they rotate with the rotor so that the solid material is fed off the bottom edge onto the impact hammers;

each of the impact hammers having along its axial length a leading blade element carried on a support of the impact hammer;

the leading blade element extending when viewed in cross-section generally radially outwardly of the axis of the rotor so as to engage and carry the solid material angularly forwardly around the axis of the rotor as it falls from the bottom edge;

the leading blade elements being formed of a hardened steel material harder than the support of the impact hammer.

Preferably the support of the impact hammer comprises a metal block to provide the required mass extending longitudinally of the rotor and radially outwardly of the axis so that the leading blade element is mounted on a front face of the block.

Preferably the leading blade element has a front face lying which is inclined relative to a bottom portion of the guide surface at the bottom edge at the location around the axis when the front face passes the bottom edge so that an outer edge of the front face is angularly advanced relative to an inner edge thereof.

Preferably the guide surface is planar and also the leading edge is planar.

Preferably the shatter bars are formed of the same hardened steel material.

Preferably there is provided an exhaust fan connected to the fine particle outlet duct for generating an additional airflow through feed opening into the first impact chamber and from the first impact chamber into the second impact chamber.

Preferably there is provided a balanced flow control door which normally doses the bottom discharge such that substantially all air exiting the outlet duct passes into the first impact chamber through the feed opening and which is arranged such that it is opened under the weight of the heavier particles to allow said release of the heavier particles through the bottom discharge.

Preferably the rotor is arranged such that rotation thereof generates an air flow acting to carry the materials from the first impact chamber into the second outlet chamber.

Preferably there is provided a plurality of reduction elements located between the impact chamber and the outlet chamber, positioned such that only particles below a predetermined size pass through the reduction means and into the outlet chamber.

Preferably there is provided a coloring system where the ground glass is impregnated or coated with a colorant.

Preferably there is provided a mixing chamber for mixing the particles into a base material where the finer material is mixed into the base material and the coarser material is applied at the surface of the base material.

Preferably the coarser material is collected at a bottom of a discharge chamber and at least some of the finer material is collected in an air stream at a top of the discharge chamber.

Preferably the material collected from the bottom of the discharge material is separated into a medium grind material for mixing with the fine material in the base material and a coarse grind material for application separately onto a surface of the base material and a return material for return to the rotary mill.

According to a second aspect of the invention there is provided an apparatus for grinding solid materials into particles comprising:

a housing having an impact chamber defined within the housing;

a rotor mounted in the impact chamber of the housing rotatable about a longitudinal axis of the rotor;

the impact chamber of the housing having a peripheral wall surrounding the axis of the rotor;

a feed opening in the peripheral wall of the impact chamber for receiving the solid materials from a feed system positioned above the feed opening for deposit onto the rotor so that rotation of the rotor acts to throw the solid materials against the peripheral wall;

the rotor having a plurality of axially extending, angularly spaced impact hammers at its periphery for rotation about the axis of the rotor which is transverse to the feed opening;

the rotor being positioned relative to the feed opening such that said impact hammers impact and deflect the solid materials entering through the feed opening, thereby fragmenting the solid materials to form finer and coarser particles;

a plurality of shatter bars located at the peripheral wall of the impact chamber arranged such that the shatter bars contact the deflected solid materials, thereby further fragmenting the solid material into said particles;

a second outlet chamber defined within the housing downstream of the rotor with the first impact chamber and the second outlet chamber being connected such that the particles pass from the first chamber to the second chamber;

a finer particle outlet duct connected to the outlet chamber and arranged to receive the particles therefrom;

a bottom discharge for allowing release of coarser particles from a bottom of the outlet chamber;

an inclined guide wall at the feed opening in the peripheral wall of the impact chamber which is directed from the opening toward the rotor;

the guide wall being inclined downwardly into the impact chamber and transversely across the opening so that the solid material slides along the guide wall into the chamber to the rotor;

a bottom edge of the guide wall being located closely adjacent the impact hammers as they rotate with the rotor so that the solid material is fed off the bottom edge onto the impact hammers;

each of the impact hammers having along its axial length a leading blade element carried on a support of the impact hammer;

the leading blade element extending when viewed in cross-section generally radially outwardly of the axis of the rotor so as to engage and carry the solid material angularly forwardly around the axis of the rotor as it falls from the bottom edge;

wherein the leading blade element has a front face lying which is inclined relative to a bottom portion of the guide surface at the bottom edge at the location around the axis when the front face passes the bottom edge so that an outer edge of the front face is angularly advanced relative to an inner edge thereof.

DETAILED DESCRIPTION

Figure 1:
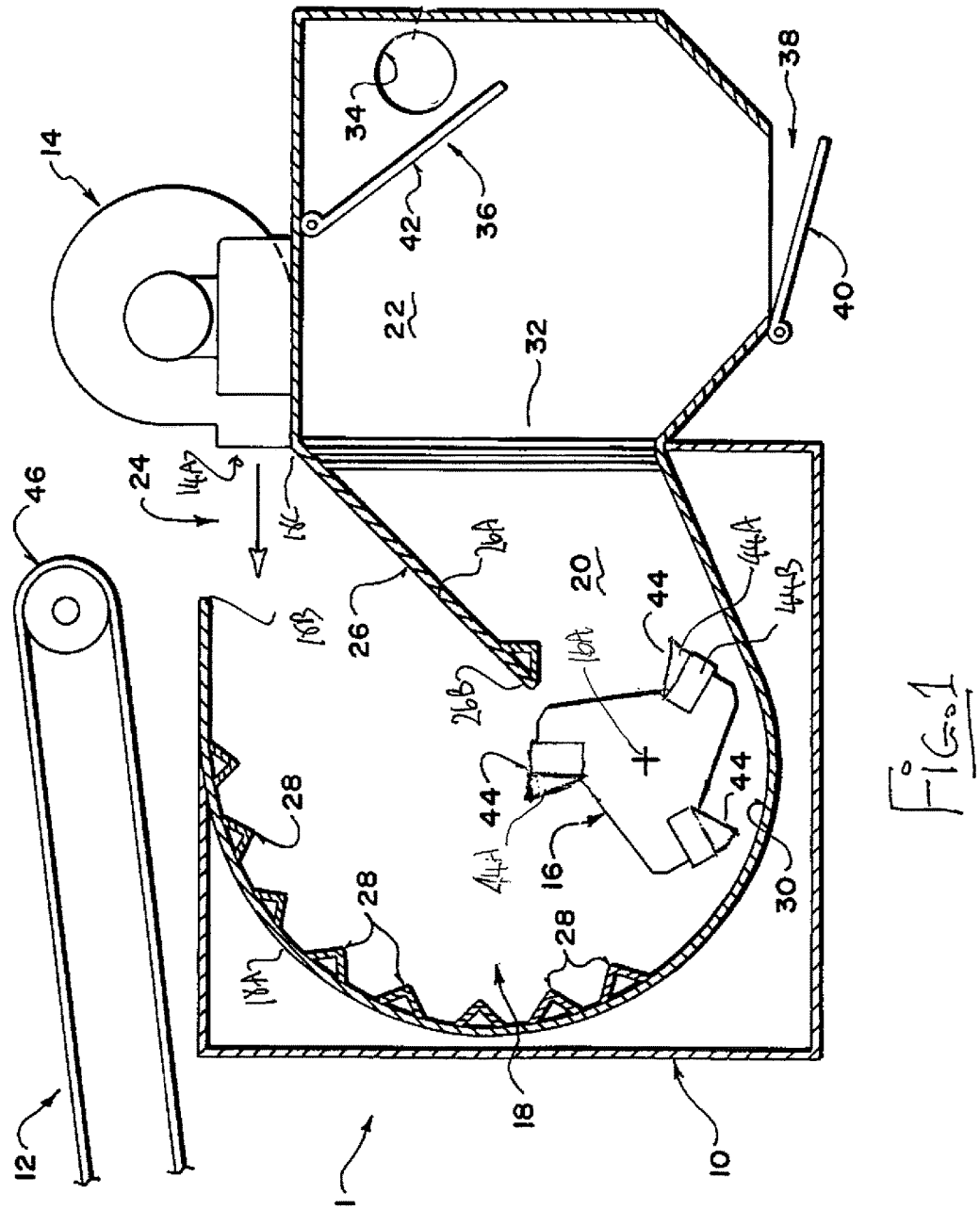
FIG. 1 is a side view in cross-section of a rotary mill according to the present invention.

Referring to the drawing, a rotary mill 1 comprises a housing 10, a material delivery system 12 and an exhaust fan 14. The housing 10 comprises a rotor 16, a primary reduction chamber 18, a secondary reduction chamber 20 and an outlet chamber 22, as shown in FIG. 1.

The primary reduction chamber 18 comprises an inlet opening 24, an intake guide surface 26 and a plurality of shatter bars 28. The inlet opening 24 provides access to the interior of the housing 10 for incoming material and for airflow generated by the exhaust fan 14. In this embodiment, the inlet opening 24 is positioned beneath the material delivery system 12. The intake guide surface 26 is arranged to direct material from the inlet opening 24 into the swept area of the rotor 16. The plurality of shatter bars 28 are arranged to further reduce particles deflected by the rotor 16 and direct these particles back toward the rotor 16 as described below.

The secondary reduction chamber 20 is connected to the primary reduction chamber 18 by a curved portion 30 as described below. The secondary reduction chamber 18 includes reduction elements 32 positioned between the secondary reduction chamber 20 and the outlet chamber 22, arranged such that particles above a given size are prevented from entering the outlet chamber 22. The reduction elements 32 may comprise staggered bars, perforated metal plates, wire screens or combinations thereof.

The outlet chamber 22 comprises an outlet opening 34 in one wall of the chamber 22, a fan control flap 36 and a lower material outlet 38. The outlet 34 comprises the exit from the housing 10 for fine particles and for airflow generated by the exhaust fan 14 as described below which generates an airflow through the chambers by injecting air at the inlet 24 as indicated at 14A. The lower material outlet 38 comprises a balanced door 40 situated at the base of the outlet chamber 22 for removal of heavy particles. Specifically, once a mass of material equal to the balance weight has gathered, the balanced door 40 opens and expels the material from the housing 10. The fan control flap 36 comprises a movable baffle 42 located within the outlet chamber 22 for controlling airflow through the housing 10 so that the amount and size of particles drawn off at the outlet 34 and the lower material outlet 38 may be varied as described below.

The rotor 16 is arranged for rotation within the housing 10 and is driven by a motor, the details of which are not shown as these will be obvious to one skilled in the art. The rotor 16 includes peripheral impact hammers 44 and is situated below the intake guide surface 26. While a rotor that exposes more blades will move more air, durable construction and suitable mass for reducing incoming material conflict with ideal air moving capabilities. However, generation of airflow by the rotor 16 is not an important consideration due to the airflow generated by the exhaust fan 14. Thus, the rotor 16 is arranged so that the impact hammers 44 have the largest mass possible within the swept area of the rotor 16. In this embodiment, the rotor 16 includes three impact hammers 44, although it is of note that the construction of the rotor 16 may vary greatly.

The exhaust fan 14 is arranged to produce an airflow through the housing. Specifically, the exhaust fan 14 connected to the fan outlet such that the airflow generated by the exhaust fan 14 is drawn into the housing 10 via the inlet opening 24 and is drawn out of the housing 10 via the outlet 34. The details of the exhaust fan 14 are not shown as these will be obvious to one skilled in the art.

The material delivery system 12 transports material to the rotary mill 1. In this embodiment, the material delivery system 12 comprises a conveyor 46. For reasons that will become apparent, the rotary mill 1 cannot be "choke" loaded. As a result, computerized control of the conveyor 46 may be used to provide a steady input volume regardless of input material size. Specifically, rotor speed and airflow may be monitored to determine loading efficiency and this information may be used to control the power source driving the conveyor 46. In this manner, the mass of material within the rotary mill 1 may be closely controlled so that attrition of material occurs at a steady rate.

In operation, the material to be reduced is transported by the conveyor 46 to the inlet opening 24. The material passes therethrough onto the intake guide surface 26 at a speed at or near free fall. The intake guide surface 26 directs the material into the swept area of the impact hammers 44 of the rotor 16. Of note is that the intake guide surface 26 is positioned such that a maximum amount of the kinetic energy generated by the rotor 16 is transferred to the material with minimal strain on the rotor 16, so that the rotor 16 needs only to tip or bump the incoming material. This transfer of kinetic energy shatters the material along natural fault planes, producing smaller particles. The smaller particles are accelerated away from the rotor 16 and into the shatter bars 28 where further reductions occur as a result of collisions between the shatter bars 28 and the smaller particles. Of note is that the shatter bars 28 do not have to be of massive structure or unusual hardness because of the reduced size of the particles. The shatter bars 28 also direct the smaller particles back towards the swept area of the rotor 16 where, in a continuous feed situation, the smaller particles encounter new particles produced by the impact hammers 44 of the rotor 16 striking newly introduced material and these secondary impacts between reflected material and recently shattered material result in further reduced particles. Of note is that the rotor 16 causes a localized increase in the pressure of the airflow generated by the exhaust fan 14. This forces entrained particles, which are naturally quite abrasive, away from the housing 10, thereby drastically reducing scrubbing and wear on the rotary mill 1. Furthermore, the reduced particles are swept by the airflow drawn through the housing generated by the exhaust fan 14 around the curved portion 30 into the secondary reduction chamber 20.

As noted above, the curved portion 30 is arranged such that the airflow generated by the exhaust fan 14 directs the reduced particles toward the reduction elements 32 in the secondary reduction chamber 20. As noted above, the reduction elements 32 are arranged such that only particles below a given size, or fine particles, pass through the reduction elements 32 and enter the outlet chamber 22 while oversized particles are directed back into the flow of reduced particles leaving the rotor path. Thus, the reduction elements 32 provide the particle size control, forming a restriction in the path that material follows through the housing 10. Furthermore, the close, staggered configuration of the reduction elements 32 causes the airflow generated by the exhaust fan 14 to change direction rapidly several times before being drawn out of the secondary impact chamber 20. This turbulent airflow prevents particle build-up from occurring on the reduction elements 32. Of note is that the position and orientation of the reduction elements 32 is not critical as they may be placed either vertically or horizontally with little or no change in their effectiveness.

Upon entry into the outlet chamber 22, the fine particles remain in the airflow generated by the exhaust fan 14 and are drawn off through the outlet 34 while heavy particles fall to the lower material outlet 38 until a mass accumulates that equals the balance weight, which opens the balanced door 40 and releases the heavy particles. The balanced door 40 ensures that air is drawn into the rotary mill 1 only through the inlet opening 24, thereby keeping a negative pressure on all parts of the housing 10 and serving as a form of dust control. Furthermore, the position of the movable baffle 42 within the outlet chamber 22 may be altered to vary the intensity of the airflow, thereby varying the amount and size of the particles drawn off through the outlet 34. In cases where this fine product has value, the flow of fine particles may, for example, be blown into a bag house or cyclone or may be turned into a slurry by the addition of a water spray. Furthermore, the heavy material which exits the lower opening can be fed into any suitable classification machinery for further processing. Thus, this arrangement also serves as a simple means of material classification.

Of note is that the position of the rotor 16 within the housing 10 is quite critical. In this embodiment, a clearance of 0.125 inches is optimum, wherein clearance refers to the ideal spacing between the rotor 16 and the housing 10 as well as the clearance between the impact hammers 44 and the housing 10. If too much clearance is allowed, turbulence occurs and entrained particles build up which greatly increase the wear on the rotary mill 1.

The importance of having a constant and steady flow of incoming material can be shown when a large particle is introduced and allowed to pass through the rotary mill 1 alone. The resulting pile of reduced material consists of a light scattering of larger particles on the top and bottom of a cross section with the majority in the center finely pulverized, as there are few particles to carry out the attrition process. However, with a constant, regulated flow of input material, there is a steady impingement between fractured particles and the particle size distribution is more even.

Clearly, time of material residency is an important factor in the successful operation of the above-described rotary mill 1. However, the tendency to return particles to the new product flow can cause a buildup of material in the system. This has been overcome by the addition of a supplementary airflow generated by the exhaust fan 14. The exhaust fan 14 creates a path of steadily moving air from the inlet opening 24 to the outlet 34. Furthermore, the airflow overcomes turbulence created by the rotor 16 and ensures that all material continues to follow the desired path through the rotary mill 1.

The housing 10 thus provides the impact chamber 18 defined within the housing with the rotor 16 mounted in the impact chamber 18 of the housing 10 rotatable about a longitudinal axis 16A of the rotor 16. The impact chamber 18 of the housing has a peripheral wall 18A which forms generally a cylinder surrounding the axis 16A of the rotor.

The feed opening 24 in the peripheral wall 18A of the impact chamber forms a space in the cylindrical wall defined by edges 18B and 18C. The feed opening is arranged for deposit of the feed material onto the rotor so that rotation of the rotor acts to throw the solid materials against the peripheral wall 18A.

The rotor 16 has a plurality of axially extending, angularly spaced impact hammers 44 at its periphery for rotation about the axis 16A of the rotor which is transverse to the feed opening 24 so that the materials are fed generally radially inwardly toward the axis.

The rotor 16 is positioned relative to the feed opening such that the impact hammers 44 impact and deflect the solid materials entering through the feed opening, thereby fragmenting the solid materials to form finer and coarser particles and throw the particles outwardly toward the plurality of shatter bars 28 located at the peripheral wall 18A of the impact chamber arranged such that the shatter bars contact the deflected solid materials, thereby further fragmenting the solid material into said particles. The shatter bars extend parallel to the axis and are arranged at angularly spaced positions around the axis.

The second outlet chamber 22 is defined within the housing downstream of the rotor 16 with the first impact chamber and the second outlet chamber being connected by the chamber 20 and the separate elements 32 so that the particles pass from the first chamber 18 to the second chamber 22.

The finer particle outlet duct 34 is connected to the outlet chamber 22 and is arranged to so that the airstream acts to extract the particles from the chamber 22 to a separator outside the outlet 34. The coarser particles are collected at the bottom discharge 38 for allowing release of coarser particles from a bottom of the outlet chamber.

Figure 2:
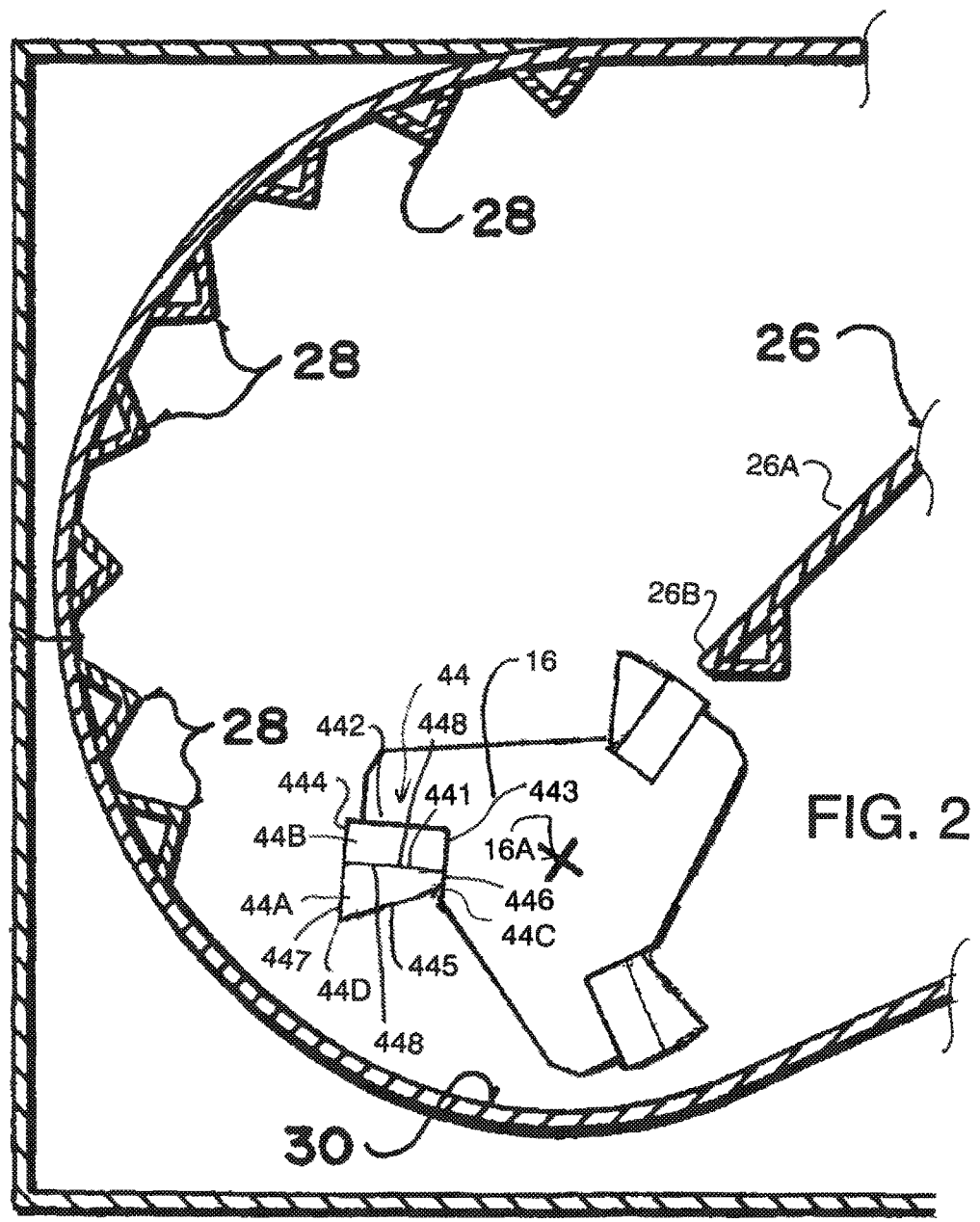
FIG. 2 is a cross-sectional view on an enlarged scale of the rotary mill of FIG. 1 showing the relationship between the tips of the rotor and the feed chute.

The guide surface 26 forms an inclined guide wall at the feed opening 24 starting at the edge 18C in the peripheral wall of the impact chamber which is directed from the opening toward the rotor 16. The guide wall 26 forms a planar surface 26A which is inclined downwardly into the impact chamber 18 and transversely across the opening 24 so that the solid material falling from the conveyor 46 slides along the guide wall surface 26A into the chamber to the rotor. A bottom edge 26B of the guide wall is located closely adjacent the impact hammers 44 as they rotate with the rotor 16 so that the solid material is fed off the bottom edge onto the impact hammers. Each of the impact hammers has along its axial length a leading blade element 44A carried on a support 44B of the impact hammer 44. The support 44B comprises a rectangular metal block which is rectangular in cross-section with a front face 441, a rear face 442, an inner face 443 and an outer face 444. The leading blade element has a front face 445, an inner face 446, an outer face 447 and a rear face 448. The inner face 446 of the leading blade element is narrower in an angular direction of the axis than the outer face 447 of the lading blade element so that the front face 445 is inclined to a radius of the axis with an outer edge 44D of the front face angularly advanced relative to an inner edge of the front face. The outer face 447 of the leading blade element 44A is coplanar with an outer face 444 of the metal block 44B. The leading blade element, when viewed in the cross-section of FIG. 2 extends generally radially outwardly of the axis of the rotor from an inner edge 44C to an outer edge 44D which passes closely adjacent the edge 26B. Thus the blade element 44A forms a leading or front face 44E so as to engage and carry the solid material angularly forwardly around the axis of the rotor as it falls from the bottom edge 26B.

The leading blade elements 44A are formed of a hardened steel material harder than the support 44B of the impact hammer. As previously explained, the impact hammers 44 are arranged to form elements of a large mass so that the support of the impact hammer comprises a metal block extending longitudinally of the rotor and radially outwardly of the axis so that the leading blade element is mounted on a front face of the block.

The hardened steel material is an iron based steel overlay wear plate material with a near nanoscale submicron microstructure applied as a coating on to the support 44B. This provides a 68 to 71 HRc single and double pass deposit and maintains a high hardness after exposure to high temperatures. This provides an exceptional resistance to severe sliding abrasion ad a toughness equivalent to 400 Brinell Q&T plate. It provides a forming or cutting response similar to standard chrome carbide plate. This is a steel alloy with a unique glass forming chemistry that allow high undercooling to be achieved during application. This results in a considerable refinement of the crystalline microstructure to a near nanosize range. It has a density of the order of 7.36 g/cm3.

Contents are as follows:
Chromium 25%
Boron 10%
Molybdenum 10%
Niobium 10%
Manganese 5%
Silicon 5%
Carbon 2%
Iron balance The leading blade element has a planar front face lying which is inclined relative to a bottom portion of the guide surface at the bottom edge at the location around the axis when the front face passes the bottom edge so that the outer edge 44D of the front face is angularly advanced relative to the inner edge 44C.

In order to improve the fracturing of the particles, the shatter bars are also formed of the same hardened steel material.

Figure 3:
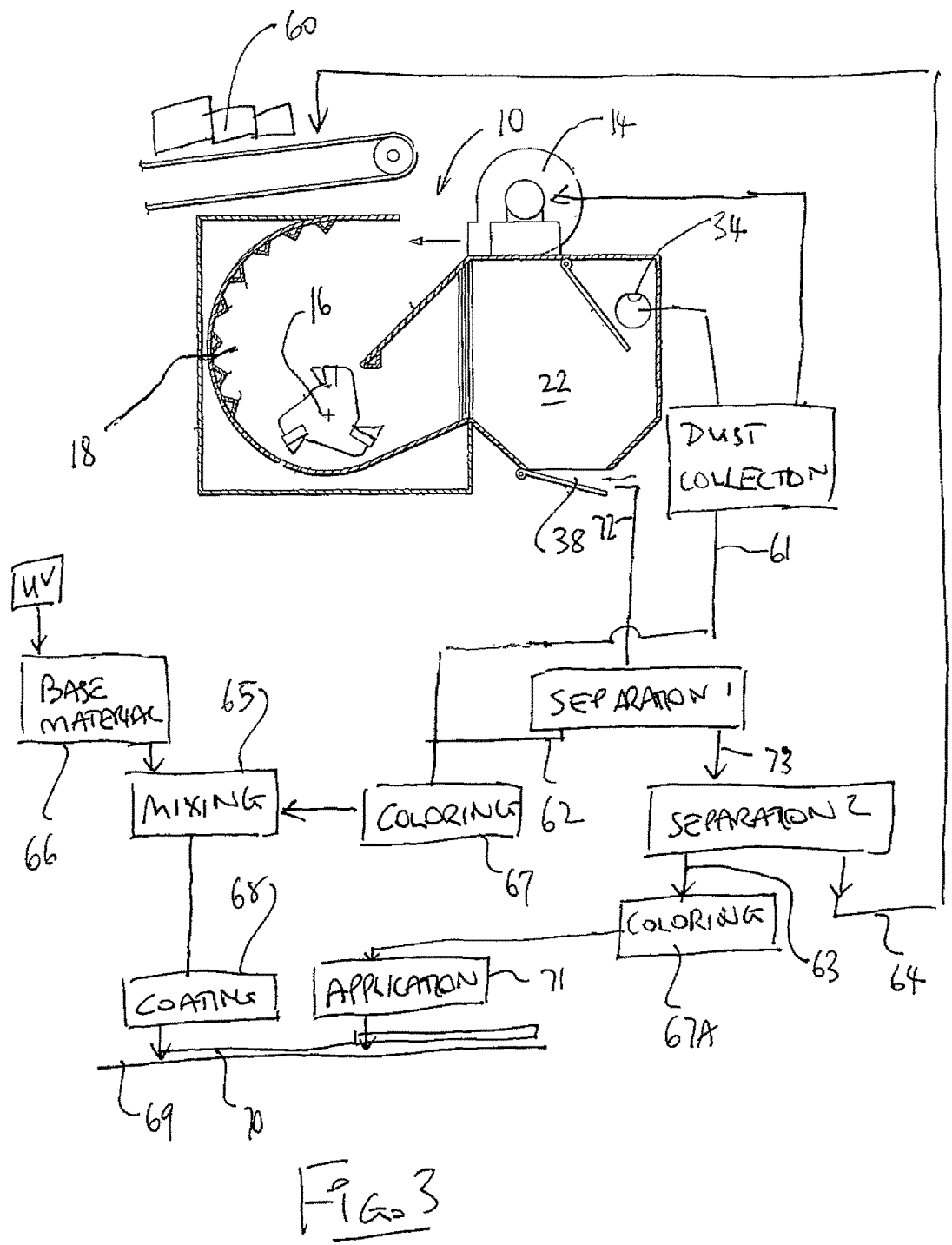
FIG. 3 is a schematic illustration of a system for use of the rotary mill of the present invention is formation of road markings containing glass ground by the rotary mill.

As shown in FIG. 3, the above grinding machine can be used in a process to generate ground glass from waste glass materials 60. This generates ground materials of different grade of particle size from the size of crystals to fine powder. This includes fine materials 61, medium materials 62, coarse materials 63 and oversize materials 64. The materials fine and medium materials 61, 62 are mixed in a chamber 65 with a base material from a supply 66 such as epoxy which is liquid in an initial state for application and sets or cures to form a solid layer after application.

In a process after the grinding as shown at 67 including heating in a suitable container, the ground glass is impregnated with a colorant.

The base material is colorless so that, when the ground glass is mixed through the base material, the color of the road markings is provided by the impregnated or applied colorant and the base material does not impede or hide the reflection of light from the glass particles within the base material.

The mixing of the ground glass through the base material acts to increase the hardness of the base material.

The base material with the ground glass admixed therein is applied simultaneously by a spray coating or brush coating process shown schematically at 68 onto a road surface and the base material 70 is cured.

Thus there is provided a coloring system 67 where the fine and medium ground glass 61, 62 is impregnated or coated with a colorant and a second coloring system where the coarse material 63 is colored.

The mixing chamber 65 receives the colored materials 61, 62 for Mixing the particles into the base material 66 where the finer material is mixed into the base material. As shown at 71, the colored coarser material 63 is applied on the surface of the base material 70 on the road surface.

As explained previously the coarser material 72 is collected at a bottom of a discharge chamber 22 and at least some of the finer material 61 is collected in an air stream at opening 34 at a top of the discharge chamber 22.

The material 72 collected from the bottom of the discharge material is separated at a separator 1 into a medium grind material 62 for mixing with the fine material in the base material 66 and a coarse grind material 73. The material 73 is fed to a second separator 2 where it is separated into the material 63 for application separately onto a surface of the base material and the oversize material 64 as a return material for return to the rotary mill.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An apparatus for grinding solid materials into particles comprising:
   a housing having an impact chamber defined within the housing;
   a rotor mounted in the impact chamber of the housing rotatable about a longitudinal axis of the rotor;
   the impact chamber of the housing having a peripheral wall surrounding the axis of the rotor;
   a feed opening in the peripheral wall of the impact chamber for receiving the solid materials from a feed system positioned above the feed opening for deposit onto the rotor so that rotation of the rotor acts to throw the solid materials against the peripheral wall;
   the rotor having a plurality of axially extending, angularly spaced impact hammers at its periphery for rotation about the axis of the rotor which is transverse to the feed opening;
   the rotor being positioned relative to the feed opening such that said plurality of impact hammers impact and deflect the solid materials entering through the feed opening, thereby fragmenting the solid materials to form finer and coarser particles;
   a plurality of shatter bars located at the peripheral wall of the impact chamber each extending axially along the peripheral wall at angularly spaced positions around the peripheral wall with the plurality of shatter bars arranged such that the plurality of shatter bars contact the deflected solid materials, thereby further fragmenting the solid material into said particles;
   an outlet chamber defined within the housing downstream of the rotor with the impact chamber and the second outlet chamber being connected such that the particles pass from the impact chamber to the outlet chamber;
   a finer particle outlet duct connected to the outlet chamber and arranged to receive the particles therefrom;
   a bottom discharge for allowing release of coarser particles from a bottom of the outlet chamber;
   an inclined guide wall at the feed opening in the peripheral wall of the impact chamber which is directed from the opening toward the rotor;
   the guide wall being inclined downwardly into the impact chamber and transversely across the opening so that the solid material slides along the guide wall into the chamber to the rotor;
   a bottom edge of the guide wall being located closely adjacent the plurality of impact hammers as they rotate with the rotor around the axis of the rotor so that the solid material is fed off the bottom edge of the guide wall onto the plurality of impact hammers;
   wherein the peripheral below the plurality of shatter bars includes a smooth surface portion surrounding the axis of the rotor into which a bed of the solid material collects at a bottom of the peripheral wall;
   so that the rotor cooperates with the smooth surface portion and the plurality of impact hammers on the rotor pass over the smooth surface portion and through the bed of the material thereon;
   wherein each of the impact hammers comprises a respective rectangular metal block which is rectangular in cross-section with a front face, a rear face, an inner face and an outer face;
   wherein each of the metal blocks extends longitudinally along the full length of the rotor and radially outwardly of the axis;
   wherein each of the plurality of impact hammers has along its axial length a respective leading blade element carried on and covering the front face of the respective metal block of the respective impact hammer, each leading blade element having a front face, an inner face, an outer face and a rear face;
   wherein each of the leading blade elements extends when viewed in cross-section radially outwardly of the axis of the rotor so as to engage and carry the solid material angularly forwardly around the axis of the rotor as it falls from the bottom edge and collects on said smooth surface portion;
   wherein each of said leading blade elements is formed of a hardened steel material harder than the respective rectangular metal block of the respective impact hammer;
   wherein the inner face of each leading blade element is narrower in an angular direction of the axis than the outer face of the leading blade element so that the front face is inclined to a radius of the axis with an outer edge of the front face angularly advanced relative to an inner edge of the front face;
   wherein the outer face of each leading blade element is coplanar with an outer face of the respective metal block.

2. The apparatus according to claim 1 wherein each of the plurality of shatter bars is formed of said hardened steel material.

3. The apparatus according to claim 1 wherein there is provided an exhaust fan connected to the finer particle outlet duct for generating an additional airflow through said feed opening into the impact chamber and from the impact chamber into the outlet chamber.

4. The apparatus according to claim 1 wherein there is provided a balanced flow control door which normally closes the bottom discharge such that substantially all air exiting the outlet duct passes into the impact chamber through the feed opening and which is arranged such that the balanced flow control door is opened under a weight of the courser particles to allow said release of the courser particles through the bottom discharge.

5. The apparatus according to claim 1 wherein the rotor is arranged such that rotation thereof generates an air flow acting to carry the materials from the impact chamber into the outlet chamber.

6. The apparatus according to claim 1 wherein there is provided a plurality of reduction elements located between the impact chamber and the outlet chamber, positioned such that only particles below a predetermined size pass through the reduction elements and into the outlet chamber.

7. The apparatus according to claim 1 wherein there is provided a coloring system where the particles are impregnated or coated with a colorant.

8. The apparatus according to claim 1 wherein there is provided a mixing chamber for mixing the particles into a base material where the finer particles are mixed into the base material and the coarser particles are applied at a surface of the base material.

9. The apparatus according to claim 8 wherein the particles collected from the bottom discharge are separated into a medium grind material for mixing with the finer particles in the base material and a coarse grind material for application separately at the surface of the base material and a return material for return to the feed opening.

* * * * *